No. 845,665. PATENTED FEB. 26, 1907.
J. T. RAMSDEN.
CLAMP FOR MOLDERS' FLASKS.
APPLICATION FILED SEPT. 7, 1906.
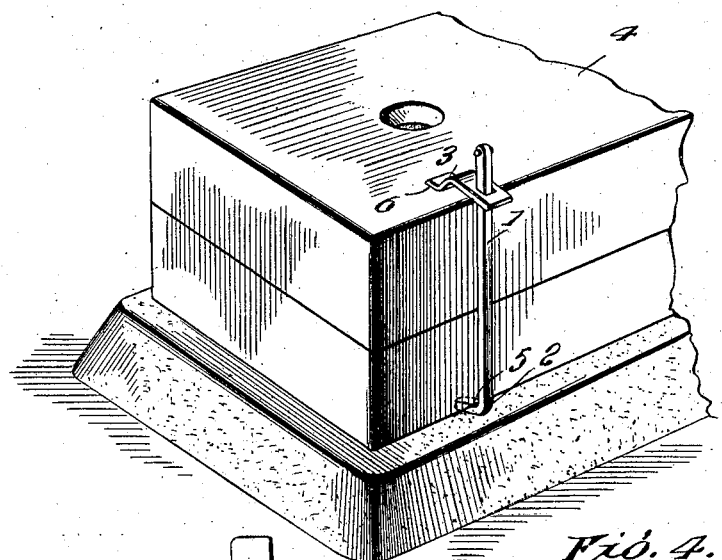
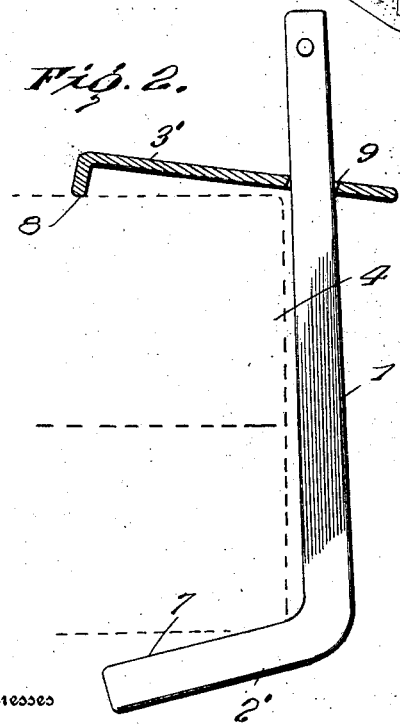
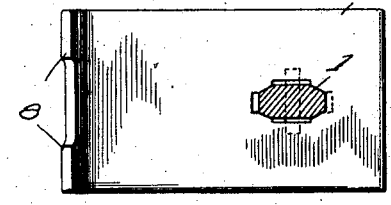
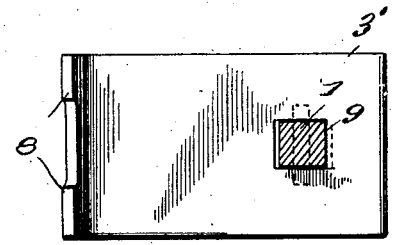
Inventor
John T. Ramsden
By Augustus B. Stoughton
Attorney
Witnesses

UNITED STATES PATENT OFFICE.

JOHN T. RAMSDEN, OF PHILADELPHIA, PENNSYLVANIA, ASSIGNOR TO TABOR MANUFACTURING COMPANY, OF PHILADELPHIA, PENNSYLVANIA, A CORPORATION OF PENNSYLVANIA.

CLAMP FOR MOLDERS' FLASKS.

No. 845,665.      Specification of Letters Patent.      Patented Feb. 26, 1907.

Application filed September 7, 1906. Serial No. 333,609.

*To all whom it may concern:*

Be it known that I, JOHN T. RAMSDEN, a citizen of the United States, and a resident of Philadelphia, in the county of Philadelphia and State of Pennsylvania, have invented a certain new and useful Clamp for Molders' Flasks and the Like, of which the following is a specification.

The principal object of the present invention is to provide a clamp which shall be comparatively inexpensive to make, efficient in use, and easy of application and removal, and which will bind or clamp by an angular movement of one of its ends about the other as a center.

To this and other ends hereinafter set forth the invention, stated in general terms, comprises the improvements to be presently described and finally claimed.

The nature, characteristic features, and scope of my invention will be more fully understood from the following description, taken in connection with the accompanying drawings, forming part hereof, and in which—

Figure 1 is a perspective view illustrating a clamp embodying features of the invention in application to a mold-flask. Fig. 2 is a side view, partly in section, illustrating a clamp embodying a modification of the invention. Fig. 3 is a plan view, partly in section, of the under side of the clamp shown in Fig. 2; and Fig. 4 is a similar view showing a clamp embodying another modification of the invention.

In the drawings, 1 is a bar provided with a fixed and immovable clamping-jaw 2 and a movable clamping-jaw 3, which is movable on and adapted to bind against the bar 1. The inclination of the jaws in respect to each other is such that the molders' flask 4 or the like will be bound or clamped between them by an angular movement of one end of the bar about the other end as a center. For this purpose the immovable clamping-jaw 2, or rather its working face 5, may be inclined inward, as shown in Fig. 1, and the movable clamping-jaw or rider 3, or rather its working face 6, may be convex, as shown. In Fig. 2 the working face of the immovable jaw 2 is inclined outward, as at 7, and the working face of the rider comprises upturned feet 8. The rider or movable arm 3 is provided with an opening or aperture 9, through which the bar 1 passes and which is somewhat larger than the bar, yet capable of firmly binding it so that the rider can be adjusted up and down on the bar, and by tilting the rider the walls of its aperture 9 firmly bind the bar and hold the rider in position. In Fig. 4 the bar is shown as of elongated eight-sided cross-section, and the opening in the rider is shown as of such shape that it binds on the inclined surfaces or faces of the bar. This construction enables the rider to bind more firmly upon the bar than does the construction shown in Fig. 3. However, in each of the constructions the same mode of operation is involved.

To apply the clamp, its movable arm or rider is placed upon one side and its fixed and immovable jaw is placed upon the other side of the object to be clamped, and in the case of the construction shown in Fig. 1 the upper end of the bar is comparatively far from the object to be clamped while this adjustment is made and the rider tilted. Thereupon the upper end of the bar is pushed inward around the lower end as a center, and thus the object is firmly clamped between the jaws. In the case of the construction of Fig. 2 the lower end of the clamp is kept comparatively far from the object to be clamped while the rider is adjusted to position and so as to bind the rod, whereupon the lower end is pushed in, and thus makes the clamp effective.

I do not intend by the use of the above language to limit my invention further than the prior state of the art may require; but,

Having thus described the nature and objects of my invention, what I claim as new, and desire to secure by Letters Patent, is—

1. A clamp consisting of a bar having clamping-jaws whereof one is fixed and immovable and whereof the other is movable and adapted to bind against the bar and one of said jaws having an outwardly-inclined working face which effects a binding action when the clamp is turned about the working face of the other jaw as a center, substantially as described.

2. A foundry-clamp consisting of a bar having clamping-jaws whereof one is stationary and the other movable, said stationary jaw consisting of the outwardly-bent end of the bar and said movable jaw consisting of a member slidable on said bar and adapted to bind on it when tilted and provided with a foot which operates both as a binding-face and as a center about which the clamp may be turned to effect a clamping action, substantially as described.

In testimony whereof I have hereunto signed my name.

JOHN T. RAMSDEN.

In presence of—
  WM. J. JACKSON,
  K. M. GILLIGAN.